US010638024B1

(12) United States Patent
Dresang et al.

(10) Patent No.: US 10,638,024 B1
(45) Date of Patent: Apr. 28, 2020

(54) POLE MOUNTED LIGHTED CAMERA

(71) Applicant: UEMSI/HTV, Menomonee Falls, WI (US)

(72) Inventors: Richard D. Dresang, Hartford, WI (US); Richard D. Ohlendorf, Cudahy, WI (US); Jacob E. Kaad, Slinger, WI (US); Stephen R. Frey, Waukesha, WI (US)

(73) Assignee: UEMSI/HTV, Menomonee Falls, WI (US)

( * ) Notice: Subject to any disclaimer, the term of this patent is extended or adjusted under 35 U.S.C. 154(b) by 0 days.

(21) Appl. No.: 16/104,159

(22) Filed: Aug. 17, 2018

Related U.S. Application Data (63) Continuation-in-part of application No. 15/084,526, filed on Mar. 30, 2016, now abandoned.

(51) Int. Cl.
*H04N 5/225* (2006.01)

(52) U.S. Cl.
CPC ....... *H04N 5/22521* (2018.08); *H04N 5/2252* (2013.01); *H04N 5/2253* (2013.01); *H04N 5/2254* (2013.01); *H04N 5/2256* (2013.01)

(58) Field of Classification Search
CPC ............. H04N 5/22521; H04N 5/2254; H04N 5/2253; H04N 5/2252; H04N 5/2256
See application file for complete search history.

(56) References Cited

U.S. PATENT DOCUMENTS

| 5,107,286 | A * | 4/1992 | Sergeant | H04N 5/2252 348/81 |
| 6,141,037 | A * | 10/2000 | Upton | A61B 1/00016 128/908 |
| 8,325,235 | B1 | 12/2012 | Tan | |
| 2002/0131781 | A1* | 9/2002 | Buck | G03B 17/00 396/419 |
| 2005/0275725 | A1* | 12/2005 | Olsson | G03B 37/005 348/207.99 |
| 2012/0242837 | A1* | 9/2012 | Sasagawa | H04N 5/247 348/159 |
| 2012/0276954 | A1 | 11/2012 | Kowalsky | |
| 2013/0063554 | A1* | 3/2013 | Green | G01S 17/875 348/36 |

(Continued)

FOREIGN PATENT DOCUMENTS

WO  WO-2009124033 A2 * 10/2009 ....... G08B 13/19619

*Primary Examiner* — Joseph G Ustaris
*Assistant Examiner* — Jill D Sechser
(74) *Attorney, Agent, or Firm* — Donald J. Ersler (57) ABSTRACT

A pole mounted lighted camera preferably includes a camera unit, a light board, a camera housing, a liquid cap, a swivel base and a swivel bracket. The camera unit preferably includes a camera, a camera circuit board and a wireless transmitter circuit board. A second embodiment of a pole mounted lighted camera includes a camera housing, a front end cap, a rear end cap housing, a light board, a wireless transmission board, a power supply board and a self-leveling unit. The front end cap includes a lens and is attached to a front of the camera housing. The self-leveling unit is attached to the rear end cap housing. The rear end cap housing is attached to a rear of the camera housing. The self-leveling unit includes a stationary housing, a self-leveling mounting block, a bearing plate, a camera eye mounting plate and an optical imaging board.

20 Claims, 8 Drawing Sheets

(56) References Cited

U.S. PATENT DOCUMENTS

| | | | |
|---|---|---|---|
| 2013/0116506 A1* | 5/2013 | Bayer | A61B 1/00016 128/908 |
| 2014/0176696 A1* | 6/2014 | Chapman | H04N 5/2251 348/84 |
| 2015/0077630 A1 | 3/2015 | Miller | |
| 2017/0026554 A1* | 1/2017 | Olsson | G03B 37/005 |

* cited by examiner

POLE MOUNTED LIGHTED CAMERA

CROSS-REFERENCES TO RELATED APPLICATIONS

This continuation in part patent application claims the benefit of patent application Ser. No. 15/084,526, filed on Mar. 30, 2016.

BACKGROUND OF THE INVENTION

Field of the Invention

The present invention relates generally to cameras and more specifically to a pole mounted lighted camera, which includes wireless transmission of an image.

Discussion of the Prior Art

Patent publication no. 2012/0276954 to Kowalsky discloses a portable camera and surveillance device. U.S. Pat. No. 8,325,235 to Tan discloses lightweight compact portable surveillance systems. Patent publication no. 2015/0077630 to Miller discloses a camera extension apparatus and method. However, none of the above prior art references disclose operating when submerged in a liquid.

Accordingly, there is a clearly felt need in the art for a pole mounted lighted camera, which includes wireless transmission of an image and which may be operated when submerged in a liquid, such as water.

SUMMARY OF THE INVENTION

The present invention provides a pole mounted lighted camera, which may be operated when submerged in a liquid, such as water. The pole mounted lighted camera preferably includes a camera unit, a light board, a camera housing, a liquid cap, a swivel base and a swivel bracket. The camera unit preferably includes a camera, a camera circuit board and a wireless transmitter circuit board. The camera circuit board receives an optical image from the camera and coverts the image into an electrical signal. The electrical signal is transmitted by the wireless transmitter circuit board to a remote receiver at some suitable wireless frequency, such as that common to Wi-Fi frequencies. An externally mounted battery powers the camera circuit board and the wireless transmitter circuit board. The camera housing preferably includes a cylindrical body, terminated with an end plate. A camera opening is formed through a center of the end plate and at least two light slots are formed through the end plate and around a perimeter of the of camera opening. The light board includes a plurality of white LEDs mounted to a circuit board. The light board is preferably powered by the camera circuit board. A camera lens hole is formed through a center of the light board. The light board is retained adjacent the end plate. The camera unit is mounted behind the light board. An outer perimeter of the camera housing includes a housing thread, adjacent the end plate.

The water cap preferably includes a cap housing, a clear sealing disc, a large o-ring and a small o-ring. The cap housing includes a cylindrical body and an inward extending end flange. An entrance to an inner diameter of the cylindrical body includes a cap thread. The cap thread is sized to be threadably engaged with the housing thread of the camera housing. The clear sealing disc is preferably glass, but other clear substances may also be used, such as durable plastic. The clear sealing disc is inserted into an end of the inner diameter of the cylindrical body. The large o-ring is then inserted into the inner diameter. The small o-ring is placed on the end plate. The cap housing is then threaded on to the camera housing. The liquid cap seals the camera opening and the at least two light slots from liquid penetration.

The swivel base includes an attachment flange and a swivel body. The swivel body extends outward from the attachment flange. A wire hole is formed through the swivel base for insertion of an electrical wire. A pivot hole is formed through the swivel body. An interconnection body includes a round outer perimeter and a camera unit cavity. An o-ring grove is formed in the round outer perimeter to receive a housing o-ring. The interconnection body is inserted into an inner diameter of the camera housing, such that the housing o-ring seals an inner diameter of the camera housing from liquid penetration. The swivel base is attached to a rear of the interconnection body with at least two fasteners. The swivel bracket includes a bracket base and a yoke projection extending from the bracket base. A space inside the yoke projection is sized to receive a width of the swivel body. A bolt is inserted through the yoke projection and the swivel body and a threaded knob is tightened to secure an angle between the swivel base and the swivel bracket. A pipe adapter includes a pipe flange and an inner pipe projection. The inner pipe projection extends from the pipe flange. The pipe flange is secured to a bottom of the swivel bracket with at least two fasteners. The pipe projection is inserted into an inner perimeter of a tubular pole. The pipe projection may be retained in the end of the tubular pole with a fastener or any other suitable fastening method.

A second embodiment of a pole mounted lighted camera includes a camera housing, a front end cap, a rear end cap housing, a light board, a wireless transmission board, an optical imaging board and a self leveling unit. The camera housing includes a camera tube and a swivel mount. The swivel mount includes a swivel base, a swivel block and a tightening screw. The swivel base is preferably attached to a side wall of the camera tube by a welding process. The swivel block is pivotally retained on the swivel base with the tightening screw. The swivel block includes a pole bore to receive pole. The front end cap includes an outer diameter, a tube diameter, a lens counter bore, a retainer bore and a trepan light bore. The front end cap is fabricated from a clear material. The front end cap is secured to one end of the camera tube. An o-ring groove is formed around the tube diameter to receive a housing o-ring. The tube diameter is sized to receive an inner diameter of the camera tube. A retainer ring includes a ring trepan bore to receive a lens o-ring. A lens is placed in the lens counter bore and the retainer ring is pressed into the retainer bore. The light board is preferably attached to the retainer ring with a plurality of fasteners. Light is emitted from a plurality of light emitting diodes (LEDs) on a front of the light board travel through the trepan light bore and out of a front of the front end cap.

The rear end cap housing includes a rear end cap, a PCB plate and a mounting plate. The rear end cap extends from one end of the PCB plate and the mounting plate extends from an opposing end of the PCB plate. The wireless transmission board is secured to the PCB plate. The rear end cap is secured to an opposing end of the camera tube with a plurality of fasteners. A diameter of the mounting plate is sized to be received by an inner diameter of the camera tube. An electrical fitting is threaded into the rear end cap to seal wires extending out of the pole mounted lighted camera.

The self-leveling unit includes a stationary housing, a self-leveling mounting block, a bearing plate, a camera eye mounting plate and an optical imaging board. The stationary housing includes a rear housing plate and a housing tube. The housing tube extends from a front of the rear housing plate. A bearing bore is formed in a rear of the rear housing plate to receive a rear bearing. The self-leveling mounting block includes a semi-circular outer perimeter, a bearing projection and a board pocket. The bearing projection extends from a rear of the self-leveling mounting block to be inserted into the rear bearing. The board pocket is formed in a front of the self-leveling mounting block and is sized to receive the optical imaging board. A power supply board is retained between two sets of standoffs. The stationary housing is attached to the mounting plate with a plurality of fasteners inserted through the two sets of standoffs. A pin bore is formed through the bearing projection to receive a three-pole connector pin. The three-pole connector pin provides electrical communication between the optical imaging board and the power supply board.

The camera eye mounting plate includes a camera base plate and a tubular bearing retainer. The tubular bearing retainer extends from a front of the camera base plate. The tubular bearing retainer includes a bearing diameter and a smaller plate diameter. The bearing diameter is sized to be inserted into a front bearing. An inner diameter of the tubular bearing retainer is sized to retain an outer diameter of a camera lens. The camera base plate is attached to the self-leveling mounting block with a plurality of fasteners. The bearing plate includes a bearing base plate, a tubular projection and a housing projection. The tubular projection extends from a front of the bearing base plate and the housing projection extends from a rear of the bearing base plate. An outer diameter of the housing projection is sized to be pressed into an inner diameter of the housing tube. A clearance hole is formed through the tubular projection to receive the plate diameter of the tubular bearing retainer. An inner diameter of the tubular projection is sized receive an outer diameter of the front bearing.

Accordingly, it is an object of the present invention to provide a pole mounted lighted camera, which includes wireless transmission of an image and which may be operated when submerged in liquid, such as water.

These and additional objects, advantages, features and benefits of the present invention will become apparent from the following specification.

DETAILED DESCRIPTION OF THE PREFERRED EMBODIMENTS

Figure 1:
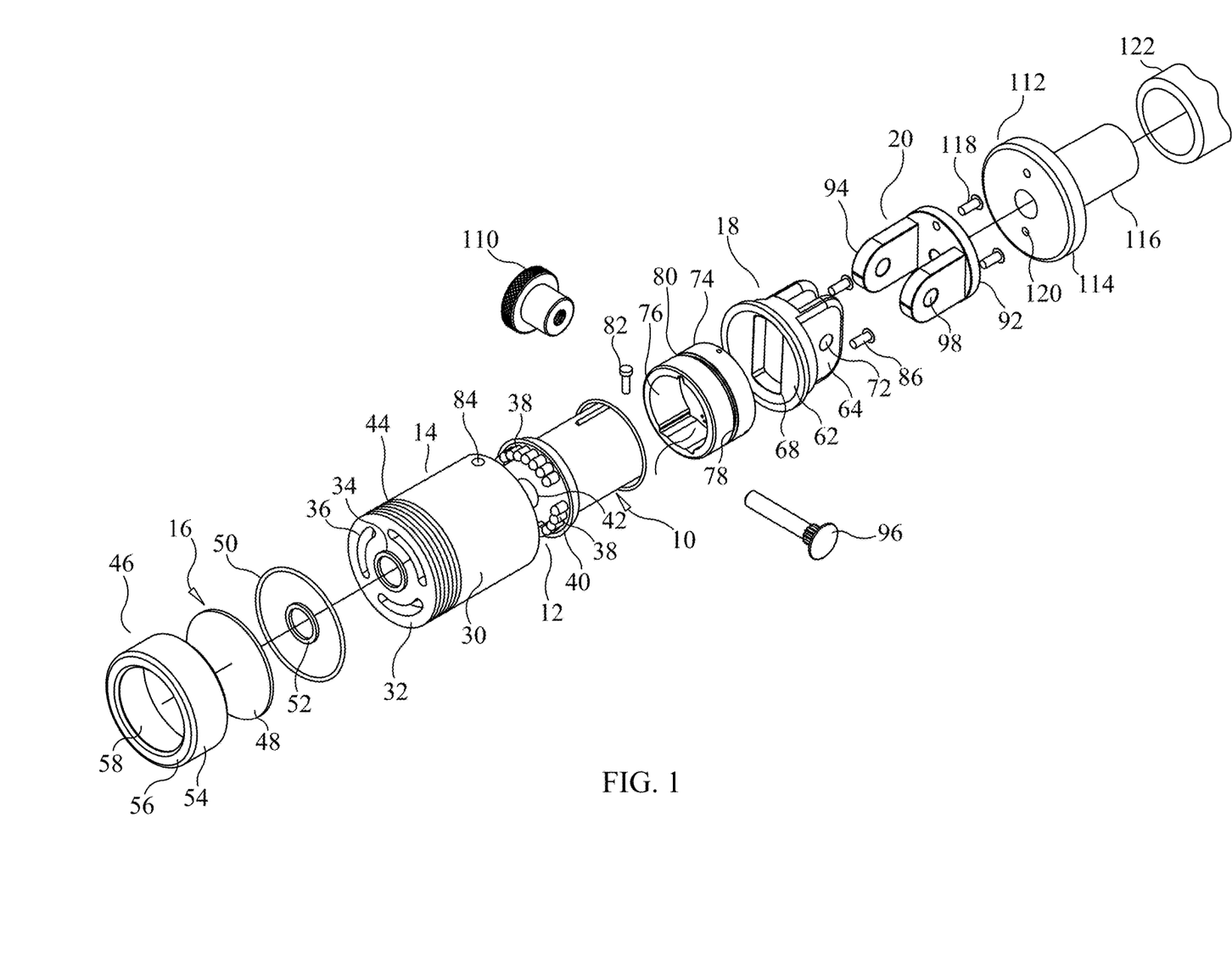
FIG. 1 is a substantially exploded perspective view of a pole mounted lighted camera in accordance with the present invention.
Figure 2:
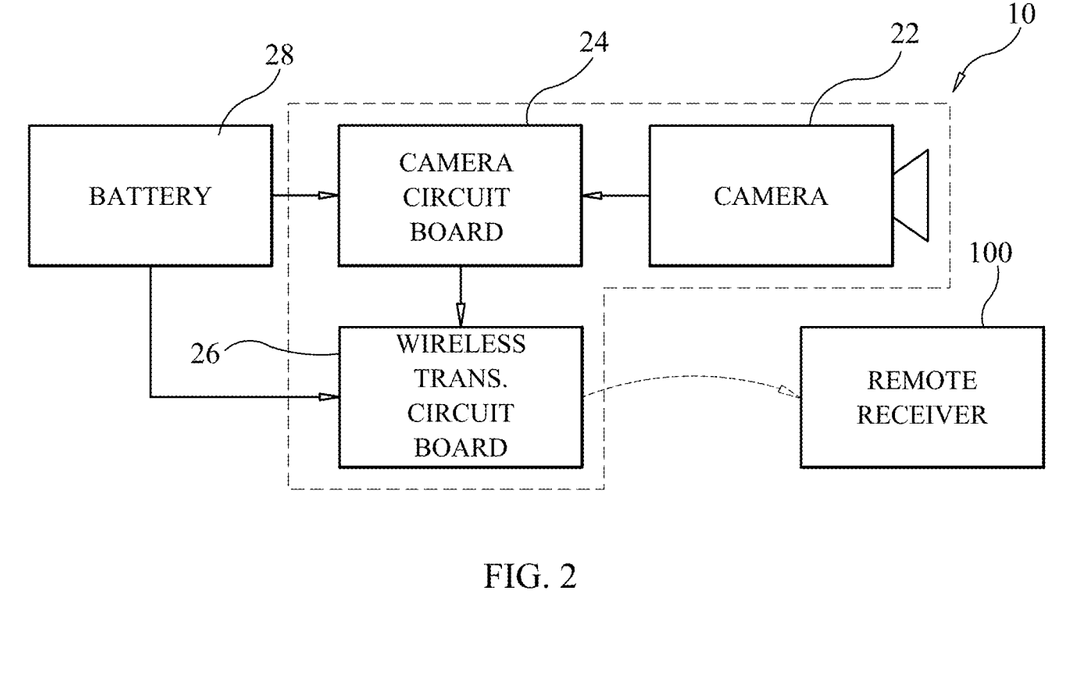
FIG. 2 is a schematic diagram of a camera unit of a pole mounted lighted camera in accordance with the present invention.

With reference now to the drawings, and particularly to FIG. 1, there is shown a substantially exploded perspective view of a pole mounted lighted camera 1. The pole mounted lighted camera 1 preferably includes a camera unit 10, a light board 12, a camera housing 14, a liquid cap 16, a swivel base 18 and a swivel bracket 20. The camera unit 10 preferably includes a camera 22, a camera circuit board 24 and a wireless transmitter circuit board 26. The camera 22 is preferably an ai-ball type of camera, but other cameras could also be used. The camera circuit board 24 receives an optical image from the camera 22 and coverts the image into an electrical signal. The electrical signal is transmitted by wireless transmitter circuit board 26 to a remote receiver 100 at some suitable wireless frequency, such as that common to Wi-Fi frequencies. The wireless electrical signal may be transmitted to Wi-Fi enabled device. An externally mounted battery 28 powers the camera circuit board 24 and the wireless transmitter circuit board 26. The camera housing 14 preferably includes a cylindrical body 30, terminated with an end plate 32. A camera opening 34 is formed through a center of the end plate 32 and at least two light slots 36 are formed through the end plate 32 and around a perimeter of the of camera opening 34. The light board 12 preferably includes a plurality of white LEDs 38 mounted to an electrical circuit board 40. However, other light emitting devices or light sources may also be used. The light board 12 is preferably powered by the camera circuit board 24. A camera lens hole 42 is formed through a center of the light board 12. The plurality of white LEDS 38 are formed adjacent an outer perimeter of the camera circuit board 24. The light board 12 is retained adjacent the end plate 32 of the camera housing 14. The camera unit 10 is mounted behind the light board 12. An outer perimeter of the camera housing 14 at an end thereof includes a housing thread 44 formed adjacent the end plate 32.

The liquid cap 16 preferably includes a cap housing 46, a clear sealing disc 48, a large o-ring 50 and a small o-ring 52. The cap housing 46 includes a cylindrical body 54 and integral inward extending end flange 56. An entrance to an inner diameter of the cylindrical body 54 includes a cap thread 58. The cap thread 58 is sized to be threadably engaged with the housing thread 44 of the camera housing 14. The clear sealing disc 48 is preferably glass, but other clear substances may also be used. The clear sealing disc 48 is inserted into an end of the inner diameter of the cylindrical body 54. The large o-ring 50 is then inserted into the inner diameter of the cylindrical body 54. The small o-ring 52 is placed on the end plate 32. The cap housing 46 is then threaded on to the camera housing 14. The large o-ring creates a seal between the clear sealing disc 48 and the end plate 32 to prevent liquid penetration inside the camera housing 14. The small o-ring 52 supports a middle of the clear sealing disc 60.

Figure 3:
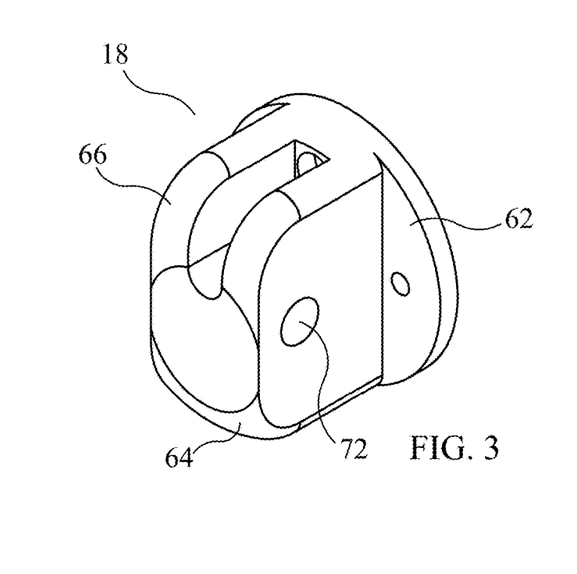
FIG. 3 is a rear perspective view of a swivel base of a pole mounted lighted camera in accordance with the present invention.
Figure 4:
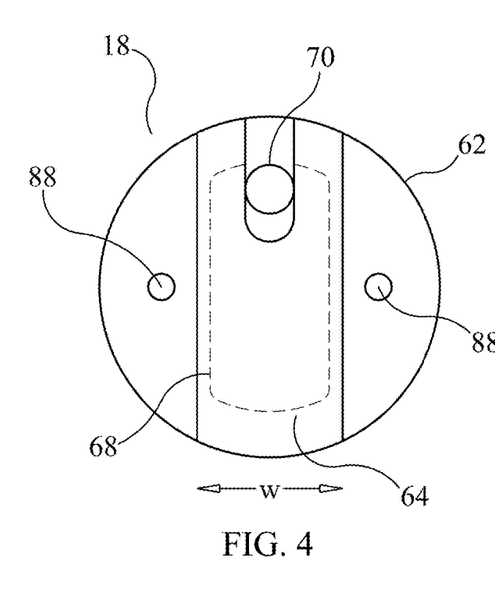
FIG. 4 is a rear view of a swivel base of a pole mounted lighted camera in accordance with the present invention.
Figure 5:
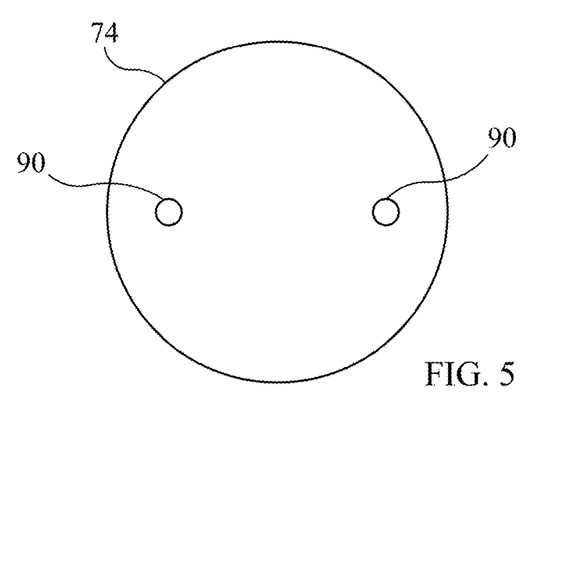
FIG. 5 is a rear view of an interconnection body of a pole mounted lighted camera in accordance with the present invention.

With reference to FIGS. 3-4, the swivel base 18 includes an attachment flange 62 and a swivel body 64. The swivel body 64 extends outward from the attachment flange 62. A wire groove 66 is formed in a rear of the swivel body 64 to provide clearance for an electrical wire. A clearance cavity 68 is formed into a front of the swivel base 18. A wire hole 70 is formed through a bottom of the clearance cavity 68 into the wire groove 66. A pivot hole 72 is formed through the swivel body, parallel to the attachment flange 62. With reference to FIG. 5, an interconnection body 74 includes a round outer perimeter and a camera unit cavity 76. A spacer 75 may be inserted into the camera unit cavity 76. An o-ring grove 78 is formed in the round outer perimeter to receive a housing o-ring 80. The interconnection body 74 is inserted into an inner diameter of the camera housing 14, such that the housing o-ring 80 seals the inner diameter of the camera housing 14 from liquid intrusion. The camera housing 14 is secured to the interconnection body 74 with at least two screws 82 inserted through at least two holes 84 in the camera housing 14. The swivel base 18 is attached to a rear of the interconnection body 74 with at least two fasteners 86 inserted through at least two holes 88 and threaded into at least two threaded taps 90.

The swivel bracket 20 includes a swivel base 92 and a yoke projection 94 extending from the swivel base 92. A space inside the yoke projection 94 is sized to receive a width "w" of the swivel body 64. A threaded bolt 96 is inserted through a pivot hole 98 in the yoke projection 94 and the pivot hole 72 in the swivel body 64. A threaded knob 110 is tightened to secure an angle between the swivel base 18 and the swivel bracket 20. A pipe adapter 112 includes a pipe flange 114 and an inner pipe projection 116. The inner pipe projection 116 extends from the pipe flange 114. The pipe flange 114 is secured to a bottom of the swivel bracket 20 with at least two fasteners 118 inserted through at least two holes 120 in the pipe flange 114. The pipe projection 116 is inserted into an inner perimeter of a tubular pole 122. The pipe projection 116 may be retained in the end of the tubular pole 122 with a fastener or any other suitable fastening method. The pipe adapter 112 may be eliminated by extending the pipe projection 116 from an end of the swivel base 92. The combination of the swivel base 18, the swivel bracket 20 and the pipe projection 116 may be called the swivel unit. The combination of the swivel base 18, the swivel bracket 20, the pipe projection 116, the threaded bolt 96 and the threaded knob 110 may be called the swivel assembly.

Figure 6:
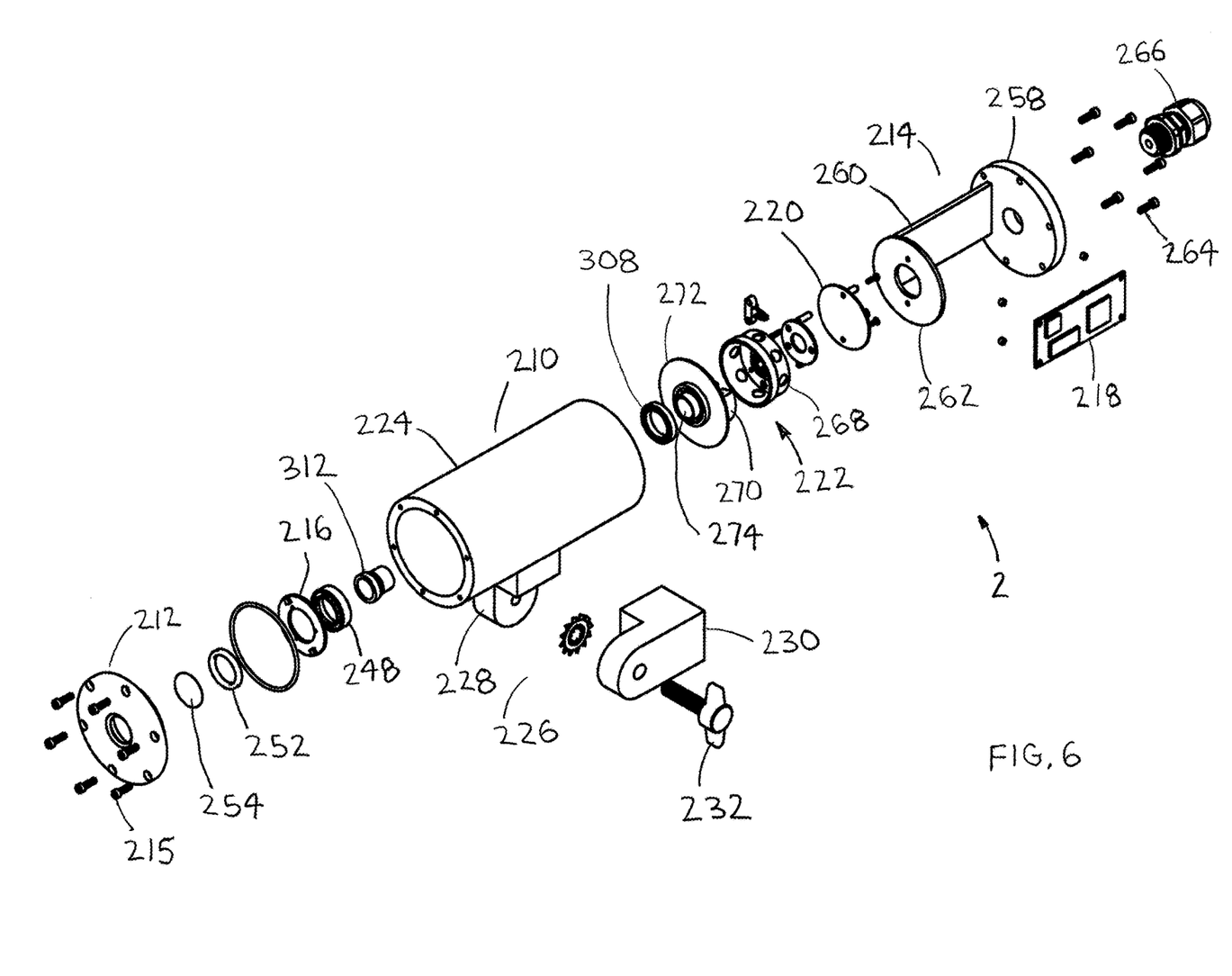
FIG. 6 is an exploded perspective view of a second embodiment of a pole mounted lighted camera in accordance with the present invention.
Figure 7:
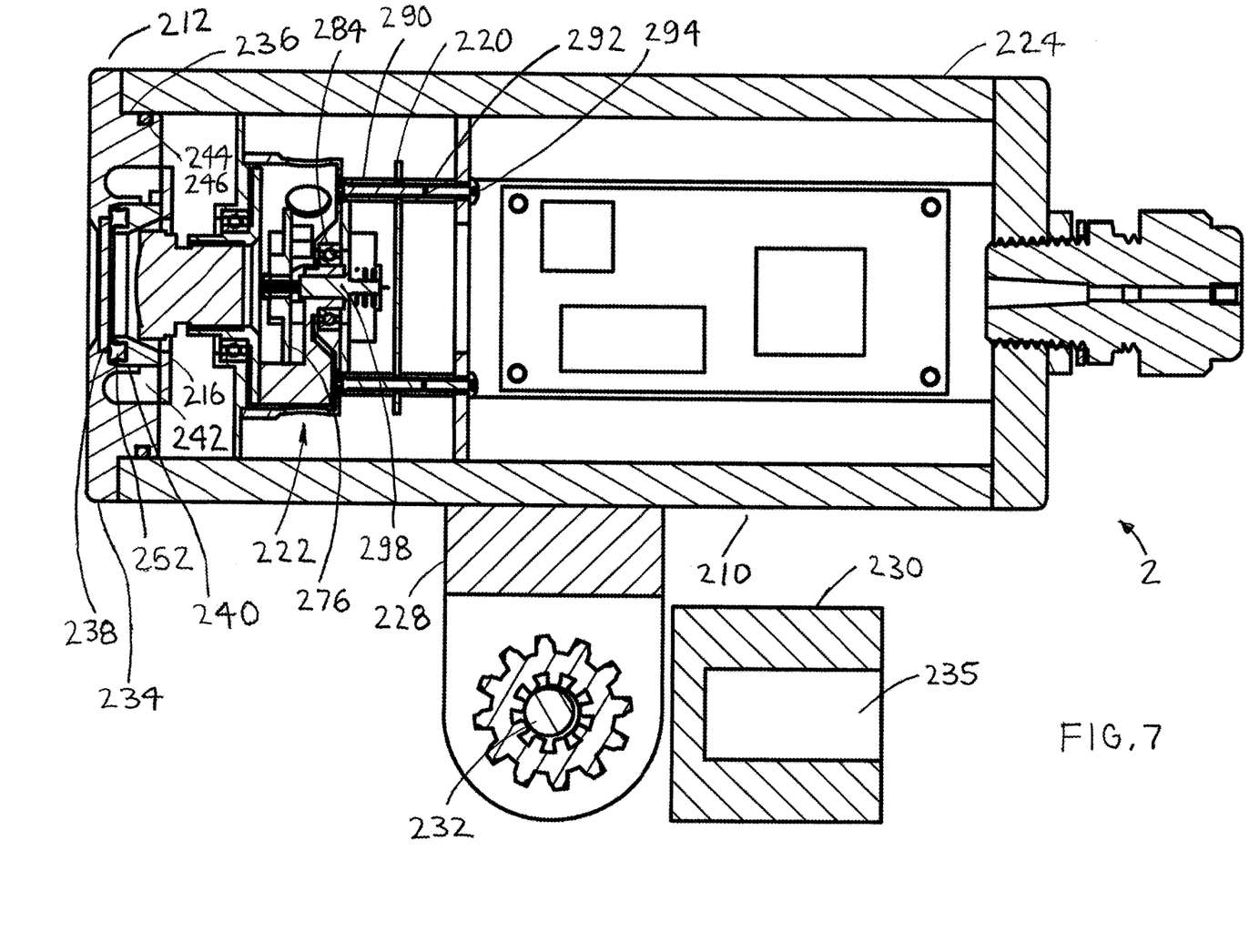
FIG. 7 is a lengthwise cross sectional view of a second embodiment of a pole mounted lighted camera in accordance with the present invention.

With reference to FIGS. 6-7, a second embodiment of a pole mounted lighted camera 2 includes a camera housing 210, a front end cap 212, a rear end cap housing 214, a light board 216, a wireless transmission board 218, a power supply board 220 and a self leveling unit 222. The camera housing 210 includes a camera tube 224 and a swivel mount 226. The swivel mount 226 includes a swivel base 228, a swivel block 230 and a tightening screw 232. The swivel base 228 is preferably attached to an outer perimeter of the camera tube 224 by a welding process. The swivel block 230 is pivotally retained on the swivel base 228 with the tightening screw 232. The swivel block 230 includes a pole bore 235 for receiving a pole (not shown). The front end cap 212 includes an outer diameter 234, a tube diameter 236, a lens counter bore 238, a retainer bore 240 and a trepan light bore 242. The front end cap 212 is fabricated from a clear material, such as some type of plastic. The front end cap 212 is secured to one end of the camera tube 224 with a plurality of fasteners 215. An o-ring groove 244 is formed around the tube diameter 236 to receive a housing o-ring 246.

Figure 8:
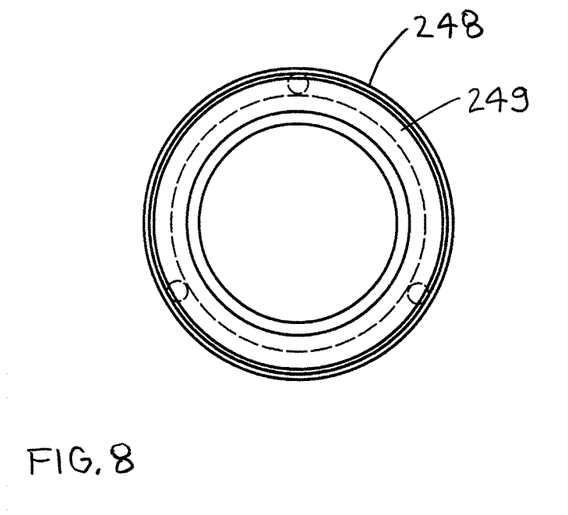
FIG. 8 is a front view of a retention ring of a second embodiment of a pole mounted lighted camera in accordance with the present invention.
Figure 9:
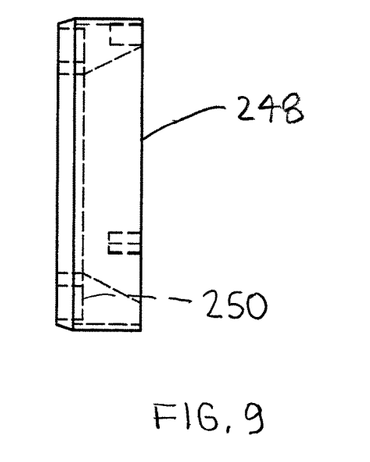
FIG. 9 is a side view of a retention ring of a second embodiment of a pole mounted lighted camera in accordance with the present invention.
Figure 10:
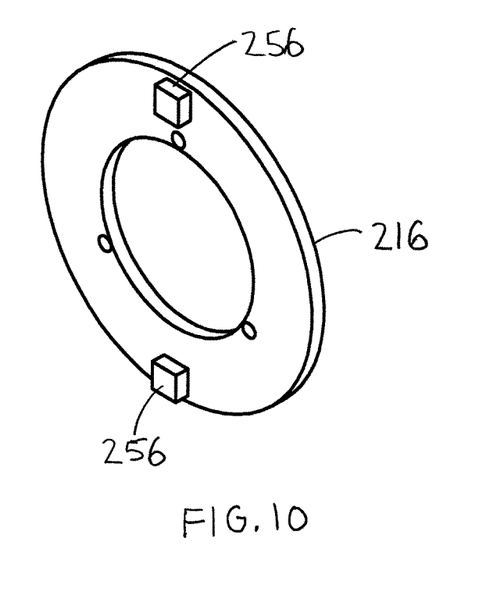
FIG. 10 is a perspective view of a light board of a second embodiment of a pole mounted lighted camera in accordance with the present invention.

With reference to FIGS. 8-9, a retainer ring 248 includes a trepan ring bore 249 to receive a lens o-ring 252. A watertight lens 254 is placed in the lens counter bore 238 and the retainer ring 248 is pressed into the retainer counter bore 240. The watertight lens 254 is preferably fabricated from sapphire to resist scratching. The light board 216 is preferably attached to the retainer ring 248 with a plurality of fasteners (not shown). With reference to FIG. 10, light emitted from a plurality of light emitting diodes (LEDs) 256 on a front of the light board 216 travel through the trepan light bore 242 and out a front of the front end cap 212.

The rear end cap housing 214 includes a rear end cap 258, a PCB plate 260 and a mounting plate 262. The rear end cap 258 extends from one end of the PCB plate 260 and the mounting plate 262 extends from an opposing end of the PCB plate 260. The wireless transmission board 218 is secured to the PCB plate 260. The wireless transmission board 218 transmits an electrical signal from the optical imaging board 276 through the power supply board 220. The rear end cap 258 is secured to an opposing end of the camera tube 224 with a plurality of fasteners 264. A diameter of the mounting plate 262 is sized to be received by the inner diameter of the camera tube 224. An electrical fitting 266 is threaded into the rear end cap 258 to seal wires (not shown for clarity) extending out of the pole mounted lighted camera 2.

With reference to FIGS. 11-16, the self-leveling unit 222 includes a stationary housing 268, a self-leveling mounting block 270, a bearing plate 272, a camera eye mounting plate 274 and an optical imaging board 276. The stationary housing 268 includes a rear housing plate 278 and a housing tube 280. The housing tube 280 extends from a front of the rear housing plate 278. A bearing bore 282 is formed in a rear of the rear housing plate 278 to receive an outer diameter of a rear bearing 284. The self-leveling mounting block 270 includes a semi-circular outer perimeter, a bearing projection 286 and a board pocket 288. The bearing projection 286 extends from a rear of the self-leveling mounting block 270 to be retained in an inner diameter of the rear bearing 284. The board pocket 288 is formed in a front of the self-leveling mounting block 270 and is sized to receive the optical imaging board 276.

Figure 11:
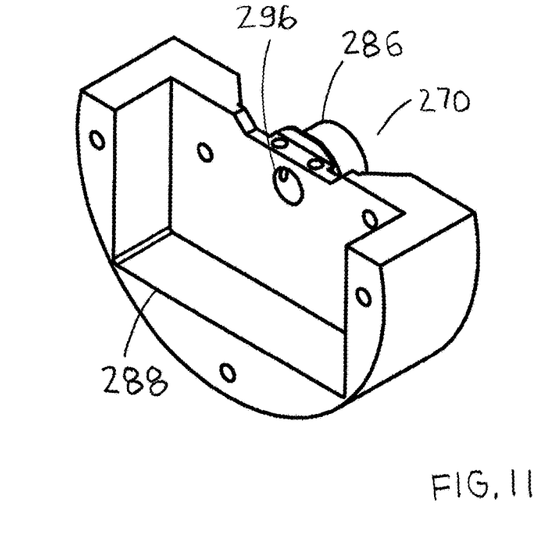
FIG. 11 is a perspective view of a self-leveling mounting block of a second embodiment of a pole mounted lighted camera in accordance with the present invention.
Figure 12:
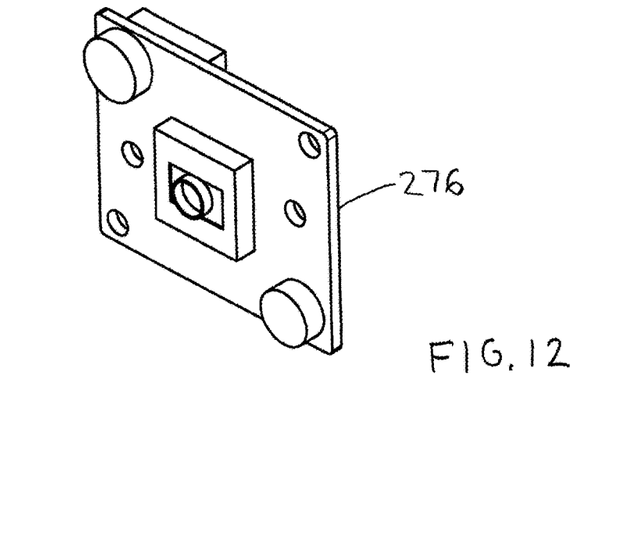
FIG. 12 is a perspective view of an optical imaging board of a second embodiment of a pole mounted lighted camera in accordance with the present invention.
Figure 13:
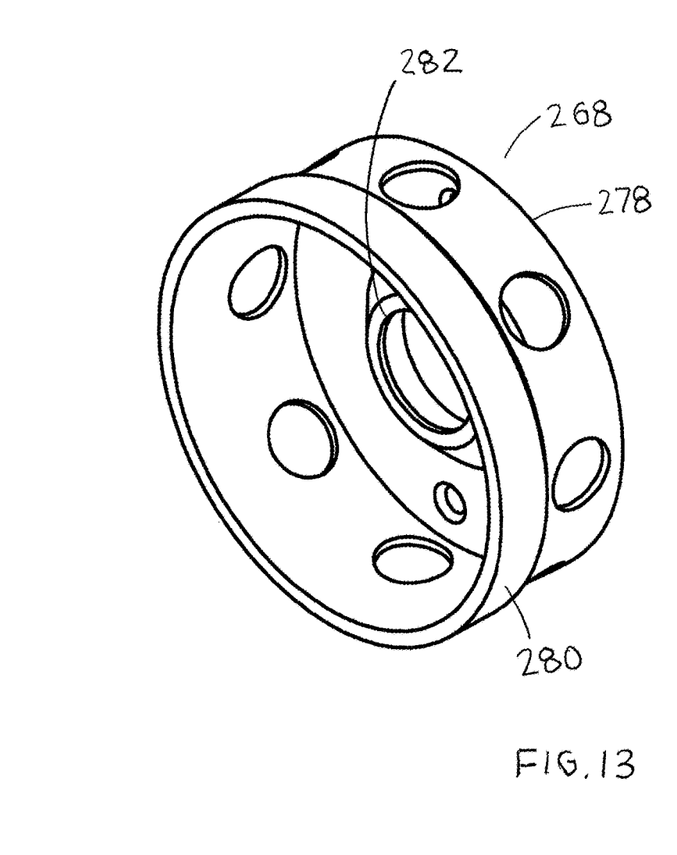
FIG. 13 is a perspective view of a stationary housing of a second embodiment of a pole mounted lighted camera in accordance with the present invention.

The power supply board 220 is retained between two sets of standoffs 290, 292. The stationary housing 268 is attached to the mounting plate 262 with a plurality of fasteners 294 inserted through the two sets of standoffs, 290, 292. A pin bore 296 is formed through the bearing projection 286 to receive a three pole connector pin 298. The three pole connector pin 298 provides electrical communication between the optical imaging board 276 and the power supply board 220. Electrical power is supply to the optical imaging board 276 from the power supply through the three pole connector pin 298. An electrical signal from the optical imaging board 276 is transferred to the wireless transmission board 218 through the power supply board 220. The power supply board 220 also supplies the light board 216 with electrical power.

Figures 14, 15:
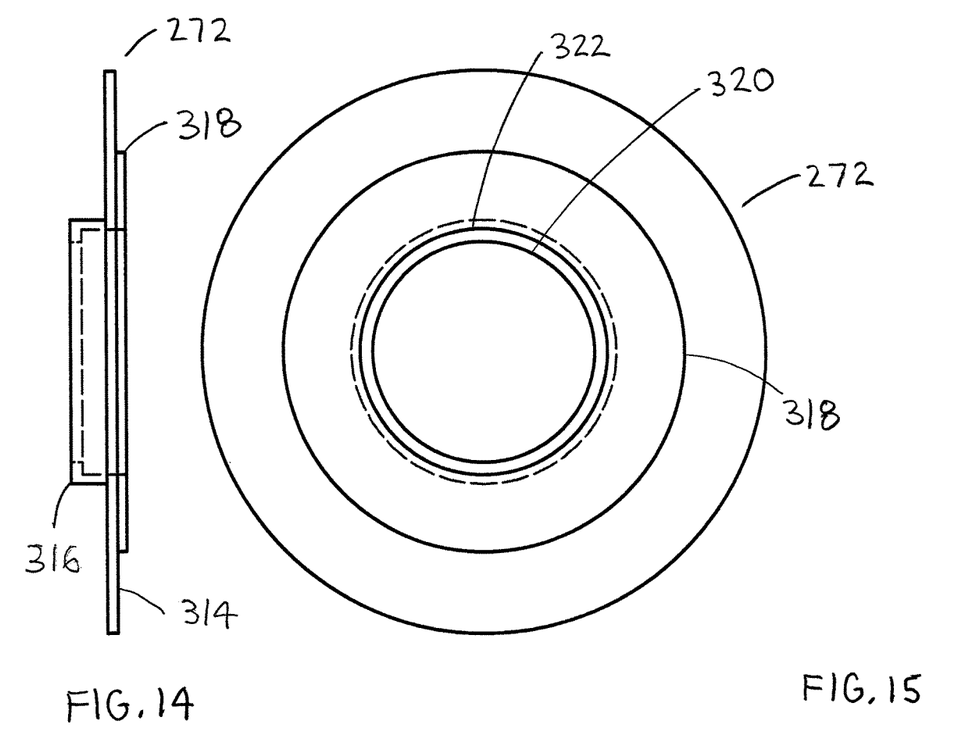
FIG. 14 is a side view of a bearing plate of a second embodiment of a pole mounted lighted camera in accordance with the present invention.
FIG. 15 is a front view of a bearing plate of a second embodiment of a pole mounted lighted camera in accordance with the present invention.
Figure 16:
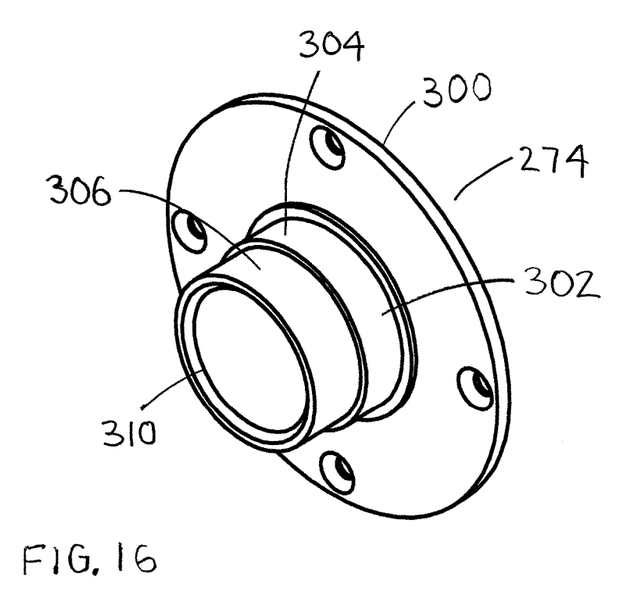
FIG. 16 is a perspective view of a camera eye mounting plate of a second embodiment of a pole mounted lighted camera in accordance with the present invention.

The camera eye mounting plate 274 includes a camera base plate 300 and a tubular bearing retainer 302. The tubular bearing retainer 302 extends from a front of the camera base plate 300. The tubular bearing retainer 302 includes a bearing diameter 304 and a smaller plate diameter 306. The bearing diameter 304 is sized to retain an inner diameter of a front bearing 308. An inner diameter 310 of the tubular bearing retainer 302 is sized to retain an outer diameter of a camera lens 312. The camera lens 312 preferably has a 110 degree angle of view. The camera base plate 300 is attached to the self-leveling mounting block 270 with a plurality of fasteners (not shown). The bearing plate 272 includes a bearing base plate 314, a tubular projection 316 and a housing projection 318. The tubular projection 316 extends from a front of the bearing base plate 314 and the housing projection 318 extends from a rear of the bearing base plate 314. An outer diameter of the housing projection 318 is sized to be pressed into an inner diameter of the housing tube 280. A clearance hole 320 is formed through the tubular projection 316 to receive the plate diameter 306 of the tubular bearing retainer 274. An inner diameter 322 of the tubular projection 316 is sized receive the front bearing. The optical imaging board 276 converts an image from the camera lens 312 into an electrical signal for wireless transmission. The pole mounted lighted camera 2 is preferably water proof up to a depth of 32 feet and filled with nitrogen gas to reduce condensation formation.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:
1. A pole mounted lighted camera comprising:
a camera tube having an inner perimeter;
a front end cap having a water tight lens is attached to a front of said camera tube;
a camera lens;
an optical imaging board receives an image from said camera lens, said optical imaging board converts the image into an electrical signal;
a self-leveling mounting block is rotatably retained in said camera tube, said camera lens is retained on said self-leveling mounting block, said self-leveling mounting block is retained in an interior area of said pole mounted lighted camera; and
a rear end cap housing includes a rear end cap, a flat plate and a mounting plate, said rear end cap extends from one end of said flat plate, said flat plate having a planar surface, said mounting plate extends from an opposing end of said flat plate, said flat plate is perpendicular to said rear end cap and said mounting plate, said rear end cap is attached to a rear of said camera tube, an outer perimeter of said mounting plate is sized to make contact with said inner perimeter.

2. The pole mounted lighted camera of claim 1 wherein:
said front end cap is fabricated from a clear material.
3. The pole mounted lighted camera of claim 1 wherein:
a light emitting board is attached to a rear of said front end cap.
4. The pole mounted lighted camera of claim 1 wherein:
a trepan bore is formed in a rear of said front end cap, said trepan bore is aligned with at least one light emitting element on said light emitting board.
5. The pole mounted lighted camera of claim 1, further comprising:
a circuit board is retained on said flat plate.
6. The pole mounted lighted camera of claim 5, further comprising:
a stationary housing is attached to said mounting plate, said self-leveling block is rotatably retained relative to said stationary housing.
7. The pole mounted lighted camera of claim 5, further comprising:
a swivel mount includes a swivel base, a swivel block and a tightening screw, said swivel base is attached to an outer perimeter of said camera tube, said swivel block is pivotally engaged with said swivel base with a tightening screw, said swivel block includes a pole bore for receiving a pole.
8. A pole mounted lighted camera comprising:
a camera tube;
a front end cap having a water tight lens is attached to a front of said camera tube;
a camera lens;
an optical imaging board receives an image from said camera lens, said optical imaging board converts the image into an electrical signal; and
a self-leveling mounting block is rotatably retained in said camera tube on opposing ends relative to said camera tube with a first set of bearings and a second set of bearings, said camera lens is retained on said self-leveling mounting block, said self-leveling mounting block is retained in an interior area of said camera tube, a bearing housing is retained inside said camera tube, said bearing housing retains an outer diameter of said first set of bearings, an inner diameter of said first set of bearings is retained and in contact with said self-leveling mounting block.
9. The pole mounted lighted camera of claim 8 wherein:
said front end cap is fabricated from a clear material.
10. The pole mounted lighted camera of claim 8 wherein:
a light emitting board is attached to a rear of said front end cap.
11. The pole mounted lighted camera of claim 8 wherein:
a trepan bore is formed in a rear of said front end cap, said trepan bore is aligned with at least one light emitting element on said light emitting board.
12. The pole mounted lighted camera of claim 8, further comprising:
a stationary housing is attached to said rear end cap housing, said stationary housing retains an outer perimeter of said second set of bearings, a rear of said self-leveling block is rotatably retained in said second set of bearings.
13. The pole mounted lighted camera of claim 8, further comprising:
a swivel mount includes a swivel base, a swivel block and a tightening screw, said swivel base is attached to an outer perimeter of said camera tube, said swivel block is pivotally engaged with said swivel base with a tightening screw, said swivel block includes a pole bore for receiving a pole.

14. A pole mounted lighted camera comprising:

a camera tube;

a front end cap having a water tight lens is attached to a front of said camera tube;

a camera lens;

an optical imaging board receives an image from said camera lens, said optical imaging board converts the image into an electrical signal;

a camera eye mounting plate includes an inner diameter for receiving said camera lens, said camera eye mounting plate is rotatably retained in said camera tube with a first set of bearings;

a bearing plate retains an outer perimeter of said first set of bearings;

a stationary housing is retained inside said camera tube, said stationary housing retains an outer diameter of said second set of bearings;

a self-leveling mounting block having a first end attached to said camera eye mounting plate, an inner diameter of said second set of bearings is retained on and in contact with a second end of said self-leveling mounting block.

15. The pole mounted lighted camera of claim 14 wherein:

said front end cap is fabricated from a clear material.

16. The pole mounted lighted camera of claim 14 wherein:

a light emitting board is attached to a rear of said front end cap.

17. The pole mounted lighted camera of claim 14 wherein:

a trepan bore is formed in a rear of said front end cap, said trepan bore is aligned with at least one light emitting element on said light emitting board.

18. The pole mounted lighted camera of claim 14, further comprising:

a rear end cap housing includes a rear end cap, a PCB plate and a mounting plate, said rear end cap extends from one end of said PCB plate, said mounting plate extends from an opposing end of said PCB plate, said rear end cap is attached to a rear of said camera tube.

19. The pole mounted lighted camera of claim 18, further comprising:

said stationary housing is attached to said mounting plate.

20. The pole mounted lighted camera of claim 14, further comprising:

a swivel mount includes a swivel base, a swivel block and a tightening screw, said swivel base is attached to an outer perimeter of said camera tube, said swivel block is pivotally engaged with said swivel base with a tightening screw, said swivel block includes a pole bore for receiving a pole.

* * * * *